(12) United States Patent
Salehi-Moghadam et al.

(10) Patent No.: US 11,158,440 B2
(45) Date of Patent: Oct. 26, 2021

(54) CAPACITIVE POWER TRANSMISSION CABLE

(71) Applicant: Enertechnos Holdings Limited, Surrey (GB)

(72) Inventors: Mansour Salehi-Moghadam, Surrey (GB); Gareth O'Brien, County Meath (IE); Charles Lucas-Clements, Surrey (GB); Dominic Quennell, Greater London (GB)

(73) Assignee: Enertechnos Holdings Limited, Surrey (GB)

( * ) Notice: Subject to any disclaimer, the term of this patent is extended or adjusted under 35 U.S.C. 154(b) by 0 days.

(21) Appl. No.: 16/972,664

(22) PCT Filed: Jun. 7, 2019

(86) PCT No.: PCT/GB2019/051593
§ 371 (c)(1),
(2) Date: Dec. 7, 2020

(87) PCT Pub. No.: WO2019/234449
PCT Pub. Date: Dec. 12, 2019

(65) Prior Publication Data
US 2021/0249156 A1    Aug. 12, 2021

(30) Foreign Application Priority Data

Jun. 7, 2018 (GB) .................................... 1809392
Jun. 29, 2018 (GB) .................................... 1810702

(51) Int. Cl.
*H01B 7/00*    (2006.01)
*H01B 7/30*    (2006.01)
(Continued)

(52) U.S. Cl.
CPC ............. *H01B 7/303* (2013.01); *H01B 9/006* (2013.01); *H02J 3/22* (2013.01)

(58) Field of Classification Search
CPC ............. H01B 7/303; H01B 9/006; H02J 3/22
See application file for complete search history.

(56) References Cited

U.S. PATENT DOCUMENTS 1,825,624 A    4/1925 Nickle
3,164,669 A    1/1965 Meyerhoff
(Continued)

FOREIGN PATENT DOCUMENTS

CN    205 508 493 U    8/2016
CN    106 384 625 A    2/2017
(Continued)

OTHER PUBLICATIONS

Anonymous: "Capacitative transfer promises significant reduction in losses—Modern Power Systems", May 15, 2018 (May 15, 2018), XP055617970, Retrieved from the Internet: URL: https://www.modernpowersystems.com/features/featurecapacitative-transfer-promises-significant-reduction-in-losses-6150871/ [retrieved on Sep. 3, 2019] figures 1, 2.

(Continued)

*Primary Examiner* — Pete T Lee
(74) *Attorney, Agent, or Firm* — Bay State IP, LLC

(57) ABSTRACT

A capacitive power transmission cable (1) having at least two sets of conductive strands (2) and the strands of the sets are distributed in a transverse cross-section of the cable, whereby the two sets are in capacitive relation to each other, wherein preferably, the capacitance is at least 10 nF/m.

37 Claims, 13 Drawing Sheets

(51) Int. Cl.
    *H02J 3/22*     (2006.01)
    *H01B 9/00*     (2006.01)

(56) References Cited

U.S. PATENT DOCUMENTS

| | | | |
|---|---|---|---|
| 4,204,129 A | | 5/1980 | Hutchins, Jr. |
| 4,546,210 A | * | 10/1985 | Akiba .................... H01B 7/303 |
| | | | 174/114 R |
| 9,589,704 B2 | * | 3/2017 | Gareis ..................... D04C 1/06 |
| 2005/0173149 A1 | * | 8/2005 | Gouge ................... H01B 12/16 |
| | | | 174/125.1 |

FOREIGN PATENT DOCUMENTS

| | | |
|---|---|---|
| JP | H07 73749 A | 3/1995 |
| WO | 2010/026380 | 3/2010 |

OTHER PUBLICATIONS

International Search Report, European Patent Office, dated Sep. 12, 2019.
Written Opinion, International Searching Authority, European Patent Office, dated Sep. 12, 2019.

\* cited by examiner

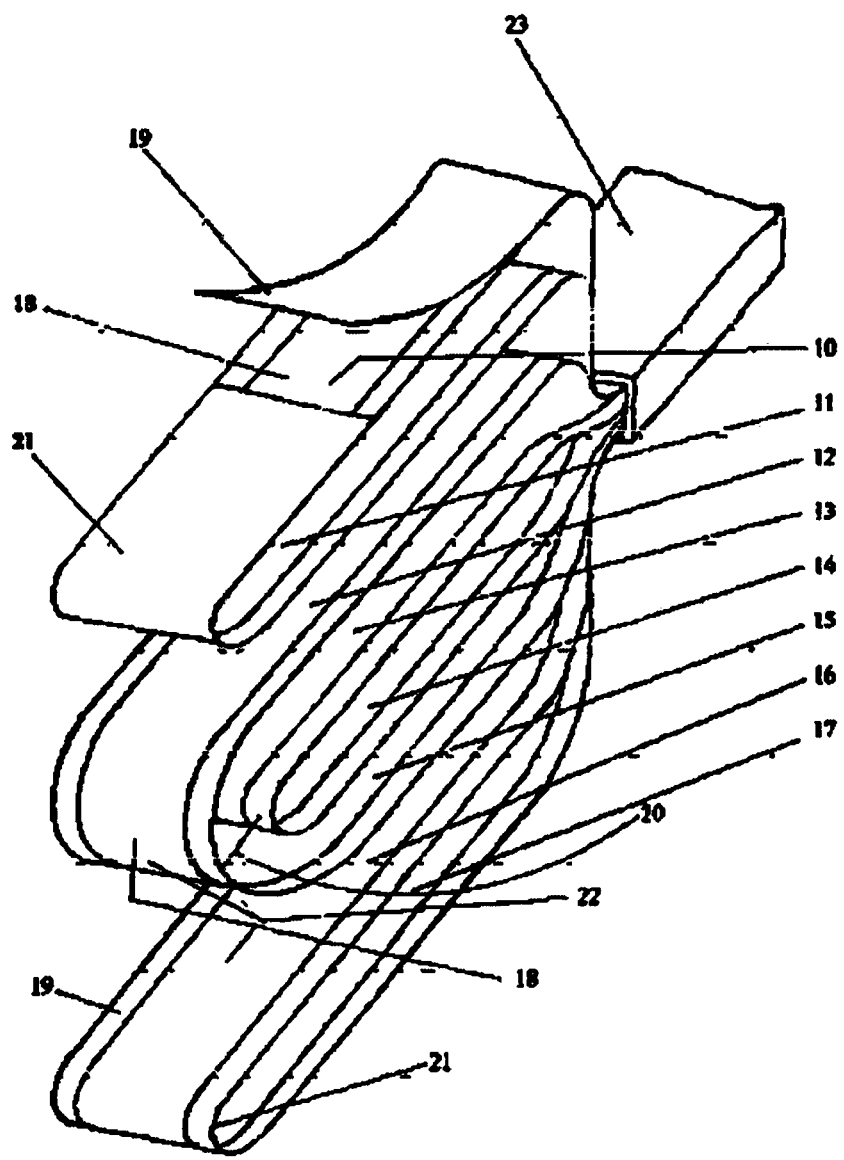
Figure 0 (Fig. 1 of WO 2010/026380)

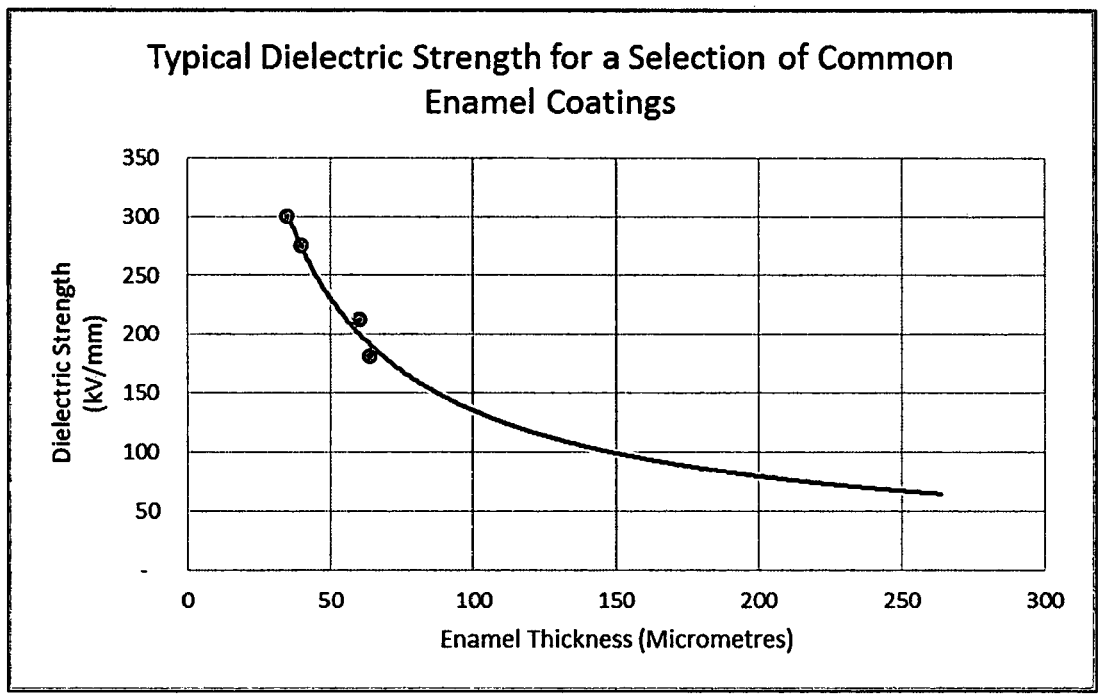
FIGURE 11 (Chart 1)
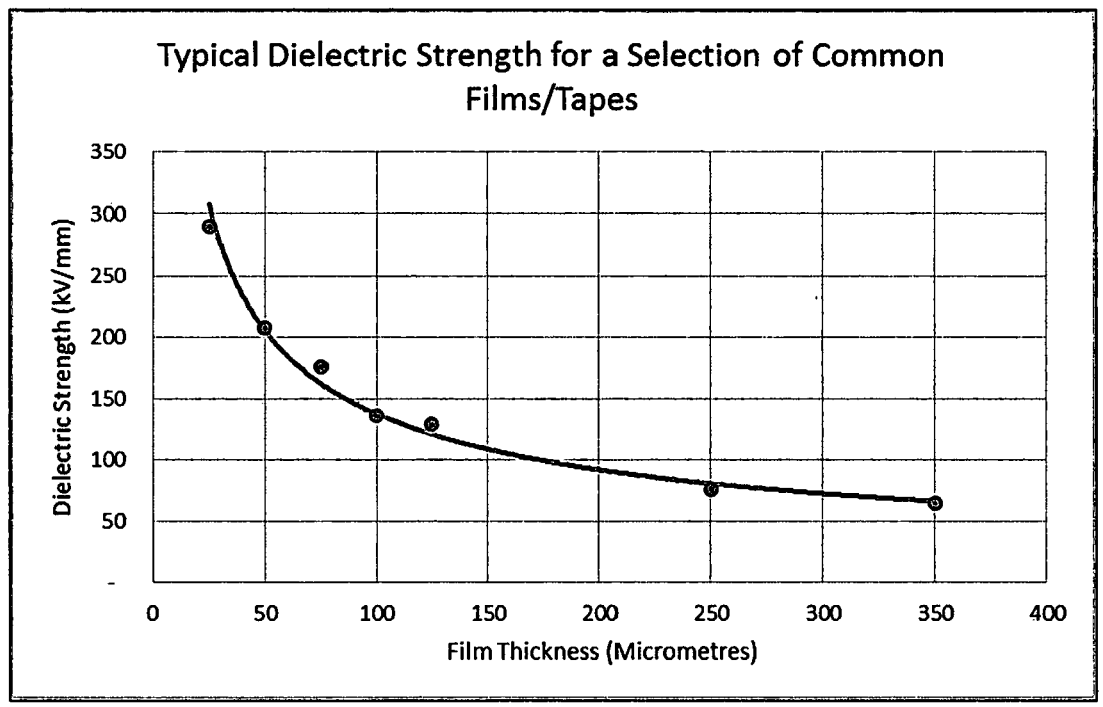
FIGURE 12 (Chart 2)

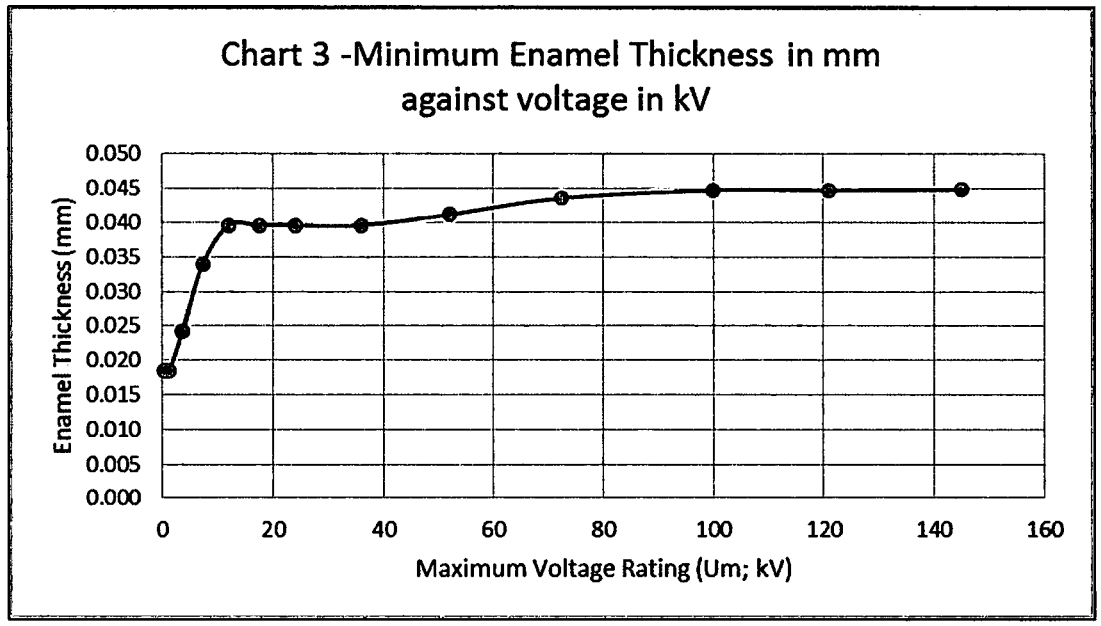
FIGURE 13 (Chart 3)
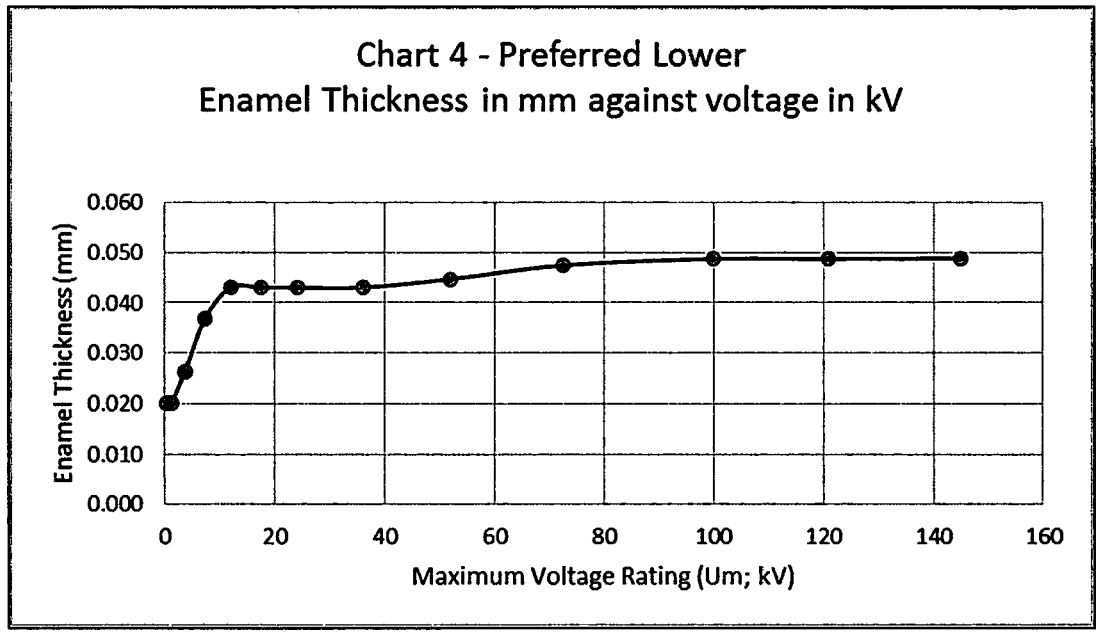
FIGURE 14 (Chart 4)

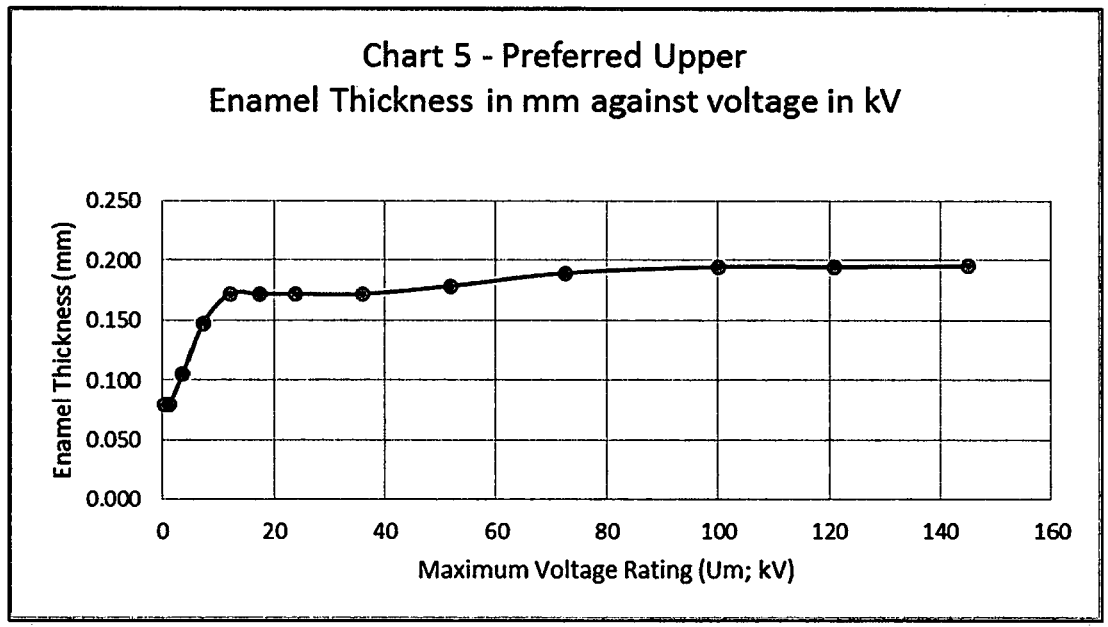
FIGURE 15 (Chart 5)
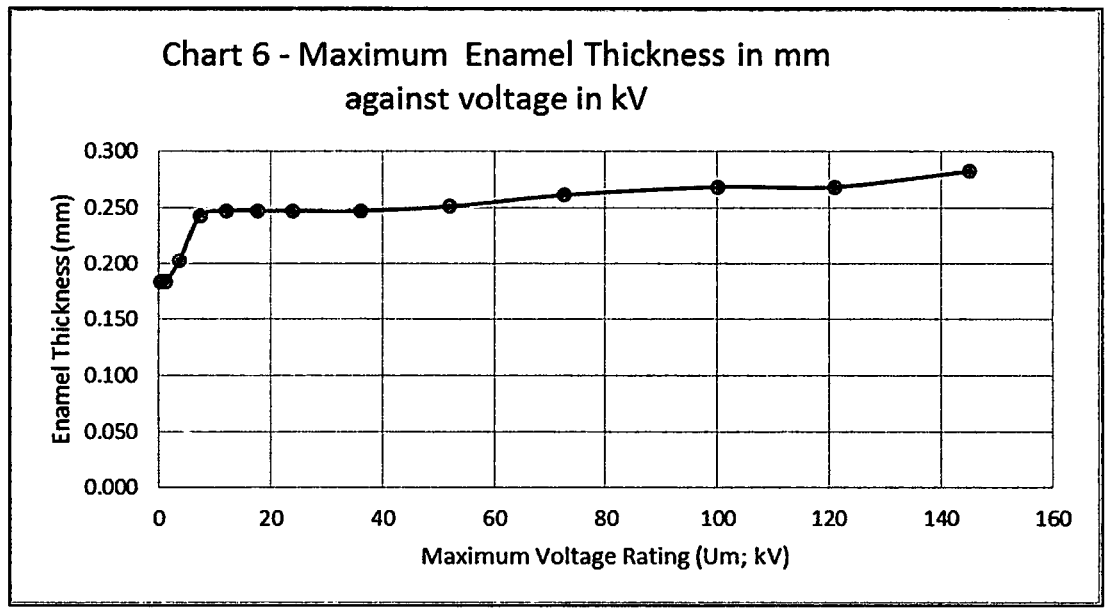
FIGURE 16 (Chart 6)

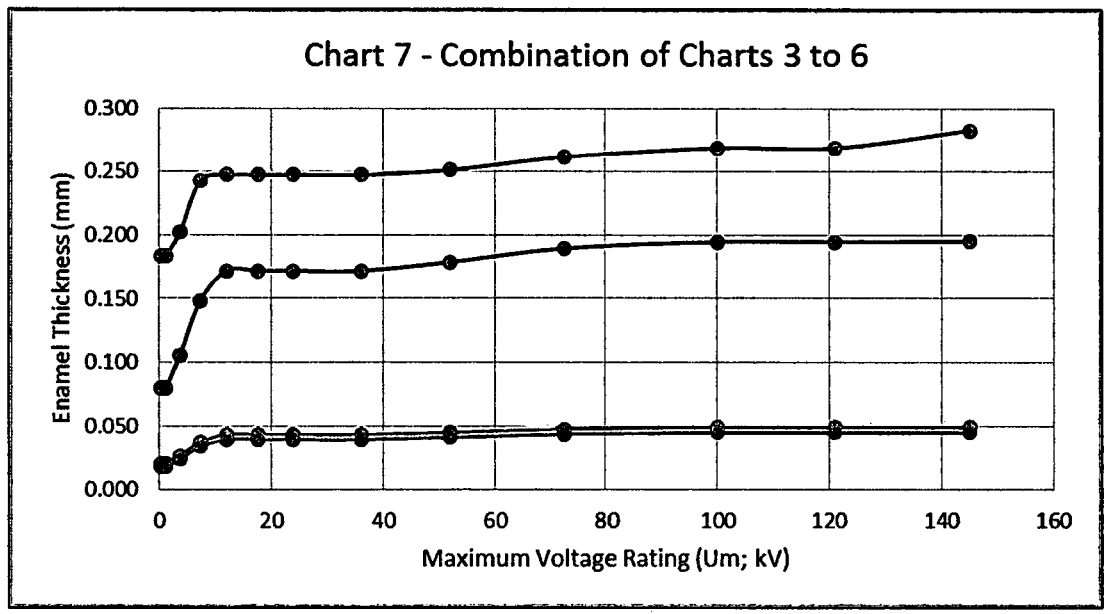
FIGURE 17 (Chart 7)
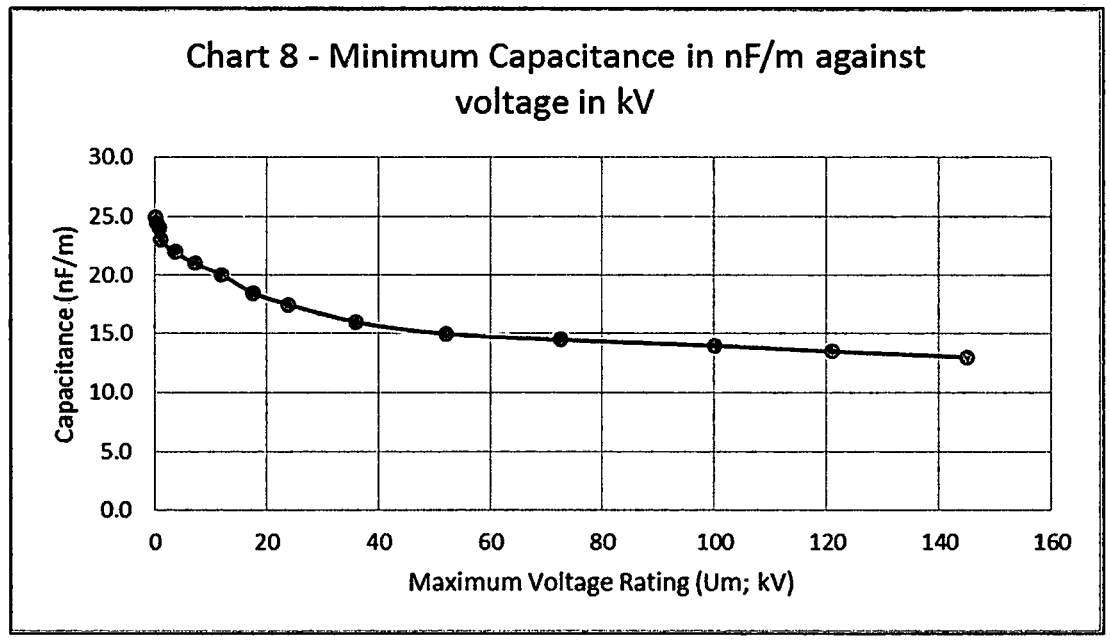
FIGURE 18 (Chart 8)

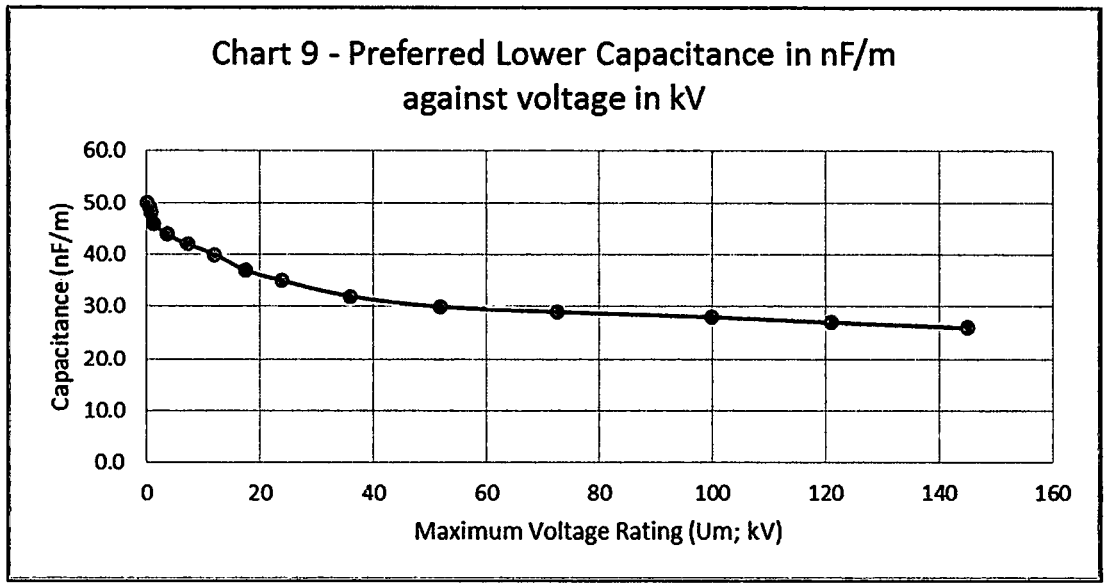
FIGURE 19 (Chart 9)
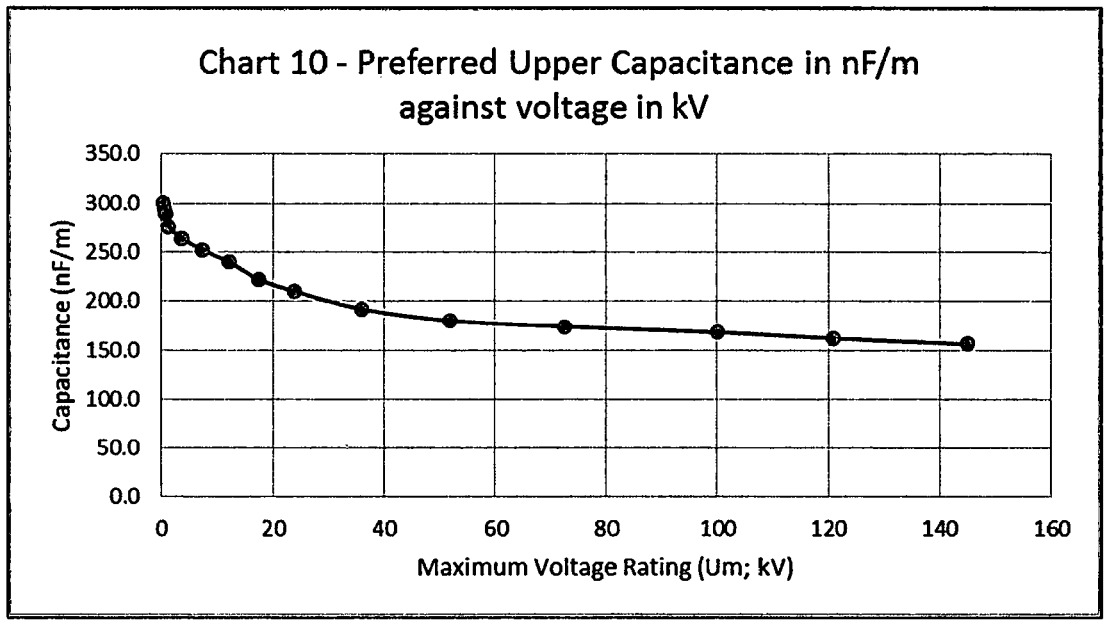
FIGURE 20 (Chart 10)

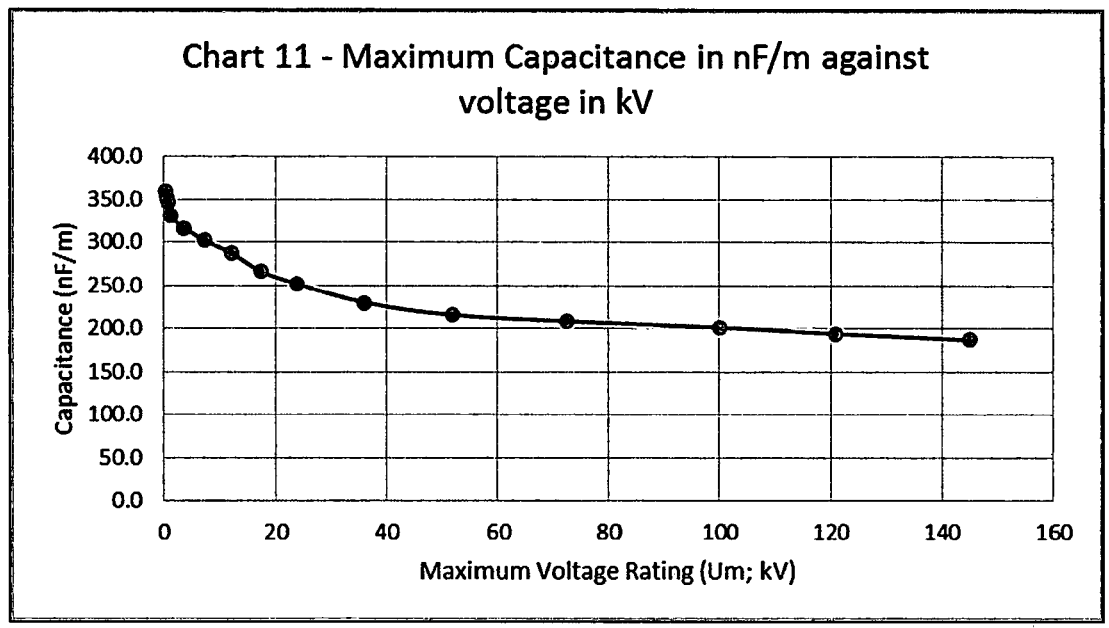
FIGURE 21 (Chart 11)
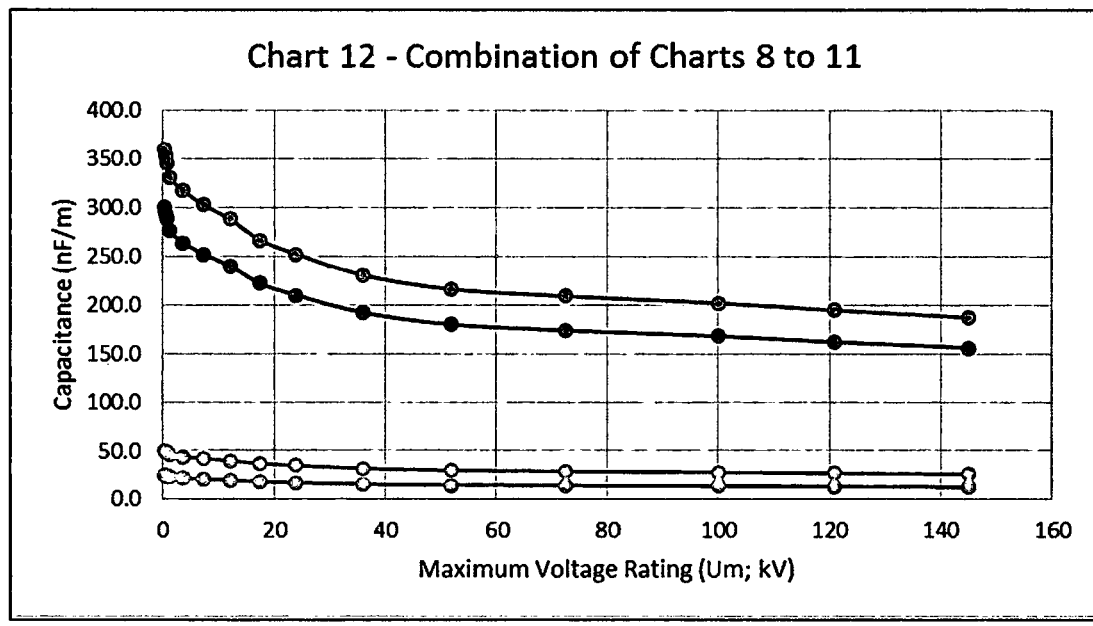
FIGURE 22 (Chart 12)

CAPACITIVE POWER TRANSMISSION CABLE

CROSS REFERENCE TO RELATED APPLICATION

This application is for entry into the U.S. National Phase under § 371 for International Application No. PCT/GB2019/051593 having an international filing date of Jun. 7, 2019, and from which priority is claimed under all applicable sections of Title 35 of the United States Code including, but not limited to, Sections 120, 363, and 365(c) and which in turn claims priority under 35 USC 119 to Great Britain Patent Application No. 1809392.2 filed on Jun. 7, 2018 and Great Britain Patent Application No. 1810702.9 filed on Jun. 29, 2018.

The present invention relates to a capacitive power transmission cable.

U.S. Pat. No. 1,825,624 describes and claims:

1. In an electrical power transmission system, a source of alternating current, a receiving circuit, a transmission circuit for interconnecting said source and said receiving circuit and a distributed capacitance interposed in series relation with said transmission circuit and having a value sufficient substantially to neutralize the inductive reactance of said transmission circuit for increasing the power limit of said system.

The abstract of U.S. Pat. No. 4,204,129 is as follows:

This invention relates to the transmission of electric power and in particular provides an electric power-transmission system having reduced vector regulation, voltage drop, and power loss through the inclusion of capacitance in the cable in series between the generator and load by utilizing electric conductors, i.e., connective links, having capacitance distributed along the length of the cable. Such capacitance is achieved by dividing a conductor into two parts which are separated by dielectric material such that the two conductor parts are in capacitive relation along the length of the cable and by connecting one conductor part to the generator and the other conductor part to the load such that the distributed capacitance is in series with the generator and load.

In WO 2010/026380 there is described, in terms of its abstract hereof:

A charge transfer zero loss power and signal transmission cable comprising, eight lengths of an electric conducting material (18), being layered in alignment, one on top of the other, each of which can be electrically jointed to give any required length. Each of the conductive layers is separated from each other by alternate layers of a dielectric material (19). The conductive layers (10-17) are formed into a charging folded closed loop (20) and a discharging folded closed loop (21) with the apex of the fold (22) of each folded closed loops in opposition to each other, being the ends of the cable, are separated from each other by a dielectric material (19), thereby making capacitive contact and is the means to transfer an electric charge from the said charging loop to the discharging loop, thereby transmitting an alternating current from a power supply to a point of transmission, with substantially zero resistance, by the said two charging and discharging loops, thereby transmitting power from a power supply over a given distance, to a point of transmission with zero power loss. The subject matter of WO 2010/026380 is hereby incorporated by reference.

It is surprising that such a capacitive cable is capable of transmitting data and/or power over a long distance with low, if not completely zero loss. Our tests have confirmed this.

For this cable, the loop formation is taught to be essential. We believe that the loop formation is not essential.

Litz wires and Milliken conductors are known and consist respectively of fine wire strands and thicker wire strands insulated from each other, typically by so called "enamel" which is polymer based as used on magnet wire, and bundled together usually with twisting. They reduce skin effect which would reduce the conductive capacity of a single round conductor with the same amount of conductive material per unit length. In Milliken conductors, the wires are not always insulated from each other, particularly where they are arranged in six segments insulated from each other. The normal extent of insulation of the wires from each other in Milliken conductors is "light"[1].

http://www.electropedia.org/iev/iev.naf/display?openform&ievref=461-01-15

Litz wires and Milliken conductors are not suitable as such since the former are suitable for light duty and Milliken conductors have only light insulation.

The object of the present invention is to provide an improved capacitive, power transmission cable.

According to a first aspect of the invention there is provided a capacitive power transmission cable comprising at least two sets of conductive strands, the sets of strands being insulated from each other and in capacitive relationship, the one with the other.

Preferably, the capacitance is at least 10 nF/m.

According to a second aspect of the invention there is provided a capacitive, power transmission cable comprising:
  at least two sets of conductive strands, the strands of the sets being distributed in transverse cross-section of the cable, whereby the two sets are in capacitive relation to each other and
all of the strands of at least one of the sets having:
  a respective insulation coating of a dielectric strength to enable the sets of conductive strands to remain isolated.

Normally there will be more than four strands per set, preferably between 19 and 547 and normally between 37 and 397.

Normally the strands will be laid in layers of opposite twist. Further the strands of the two, or more sets, are preferably alternated in their layers.

The cable can be provided with an outer sheath which can include an armouring of spirally laid steel wires. The armouring can be an earth conductor.

Alternatively, the strands can be laid in alternating layers of all one set and then all another set.

Conveniently, the insulation is of the type used in so called "magnet wire" and is at least 18 μm thick, and preferably it is between 24 μm and 262 μm thick and normally between 26 μm and 190 μm thick.

According to a third aspect of the invention there is provided a capacitive, power transmission cable comprising:
  at least two sets of conductive strands and
all of the strands of at least one of the sets having:
  a respective insulation coating, whereby the two sets are in capacitive relation to each other,
the conductive strands being laid in layers of opposite twist, with strands of at least two sets in each layer.

The insulation can be extruded, wound or woven, but are preferably of enamel typically of the type used in so called "magnet wire".

Further the strands of the two, or more sets, are preferably alternated in their layers.

In all three aspects, whilst one of the sets of conductive strands can be uninsulated, with the insulation of the strands of the other set providing the isolation, preferably both all of strands have their own insulation.

Preferably the respective insulations of the sets will be differently coloured to allow their separation for connection at opposite ends of the cable. Where more than two sets of strands are provided, they will each have a respective colour.

Additionally to their insulation, the strands will normally be provided with soft polymer insulation between each layer to fill interstices between individual strands.

According to a fourth aspect of the invention there is provided a capacitive, power transmission cable comprising:
- at least two sets of conductive strands, the conductive strands being
  - laid in layers of opposite twist, with
    - the strands of one or more adjacent layers being of all one set and then radially outwards the strands of one or more adjacent layers being of all another set and
  - insulation between the layers of different sets, whereby the at least two sets are in capacitive relation to each other.

Whilst the individual strands could be insulated, with different colours for aiding their identification, they need not be in this aspect. Otherwise, they are preferably differently coloured as by tinning of one set and leaving the other set untinned.

The interlayer insulation is preferably of polymer tape and is preferably between 25 µm and 2.7 mm thick and normally between 30 µm and 1.35 mm thick.

In the previous aspects, the strands will normally be compressed, as by passing through a die, after addition of each layer. The degree of die compression is controlled to avoid damage to the insulation where provided at contact with the outer periphery of the strands.

The conductors will normally be copper or aluminium wire. Normally the insulation will be so called enamel, as used in so-called magnet wire.

As with conventional power transmission cables, the power capacity of the cable dictates the conductor total cross-sectional area of cables of the invention. At the ends of the cable most of the current will be carried by one or other of the two sets of strands. If the each set of strands were to have the conventional cross-sectional area of conductor, the cable would use twice as much conductor metal. However, the amount of conductor can be modified at either end by increasing the proportion of one set at one end and the other at the other. This can be done by reducing the number of strands in one set and increasing the number of strands in the other. Alternatively in the case of the layers being of alternating sets, an extra, outer layer of one set can be included. The former uses the same amount of conductor and the latter uses more conductor. It is anticipated that this can be at the ends only, in one or two portions of cable, typically 250 m to 400 m in length for buried cable, the balance of the cable being of normal cable portions. The portions can be joined as described below. Where for instance the cable is subsea cable, the majority of it can be laid up as one long portion without connectors. This is particularly convenient with layered cable in which all the strands of one layer are of one set and all of them of another are of another set. With the strands within the sets being uninsulated in their layers, although insulated layer from layer, since new lengths of strand can be incorporated progressively in the lay-up. Further we expect the minimum conductor cross-sectional area to be 50 mm$^2$.

According to a fifth aspect of the invention, there is provided a capacitive, power transmission cable comprising at least two sets of conductive strands, the sets of strands being insulated from each other and in capacitive relationship, the one with the other, and the capacitance being at least 10 nF/m.

Preferably the capacitance between the sets of strands is within the range 25 to 360 nF/m for a 240 volt cable and 13 to 187 nF/m for a 145 kV cable and particularly within the range 22 to 317 nF/m for a 3.6 kV cable and 14.5 to 209 nF/m for a 72.5 kV cable. It will be noted that counter-intuitively, due to the geometry of the lay-up of the strands and their diameter, the achievable capacitance between the set of them falls with increasing rated voltage. It should be noted that the invention is not restricted to 145 kV cables. Higher voltage cables can be envisaged.

Where, as envisaged to be possible, both electrode sets of conductors have identical enamel insulation, they will not be visually distinguishable. However, it is envisaged that they can identified individually at one end by application of an electrical signal to them at the other. Conveniently, the conductors will be grouped together into one electrode set at the other end, and indeed preferably be connected together, with the signal applied and then sorted at the one end to identify the other electrode according to whether the signal is present or not on individual conductors.

Normally and particularly where layers are insulated from each other, the layers will be of single conductor diameter thickness. However, it can be envisaged that the layers may comprise two sub-layers of conductors, conveniently one laid one way and the other. Indeed, the sub-layers within each layer could be combined by braiding.

According to a sixth aspect of the invention, there is provided a capacitive, power transmission cable comprising:
- at least two sets of conductive strands, the sets of strands being insulated from each other and in capacitive relationship, the one with the other,
- insulation around the capacitively connected sets of strands, and
- a grounding sheath around the insulation, the grounding sheath being in capacitive connection with the capacitively connected sets of strands, with the insulation being sufficiently thick to act as a dielectric causing conductive strands to sheath capacitance to be substantially two orders of magnitude, or more, less than capacitance between the two sets of strands.

It happens that conventional insulation and sheath to core capacitance, typically 8 mm of polyethylene, does provide the two orders of magnitude less capacitance in practice.

For connection of a capacitive, power transmission cable to supply and load conductors, a connector block will normally be provided with terminals for the first and second sets of conductors. One terminal in each block will normally be isolated without a supply or load connection terminal, whilst the other will be provided with a supply or load terminal. The blocks facilitate connection of the cable as a capacitive cable, with one set of conductors connected in use to the supply and the other set of conductors connected at the other end to the load.

Either or both of the supply and load connectors can have bus-bars permanently connect to the supply and load terminals. Indeed, such bus-bars can comprises these connectors.

For connection of two lengths of cable of the invention, two alternative connectors will be provided. A parallel-connection one will be provided with respective terminals for respective sets of conductors on both sides and with internal interconnections, whereby the one conductors of one length can be connected to the one conductors of the other length and the other conductors similarly connected. A series-connection connector has a terminal on one side for one set connected internally to a terminal on the other side for one or other set of the other length. The remaining sets are terminated in isolated terminals on the respective side of the connector.

A long run of cable is anticipated to have its capacitance determined by use of parallel connectors between certain lengths and series connectors between other lengths.

Cables with three or more sets of cables can be used to further choose the capacitance of the cable, by adding conductors of a third set in parallel to those of the first set for instance and of a fourth set in parallel to those of the first set, the third and fourth sets being capacitively connected.

Alternatively, or in addition, a separate set of conductors can be connected at both ends to provide a straight through connection.

To help understanding of the invention, a various specific embodiment thereof will now be described by way of example and with reference to the accompanying drawings, in which:

FIG. 11 is a chart of typical dielectric strength for a selection of common enamel coatings;

FIG. 12 is a chart of typical strength for a selection of common films/tapes;

FIG. 13 is a chart of the minimal enamel thickness in mm against voltage in kV;

FIG. 14 is a chart of the preferred lower enamel thickness in mm against voltage in kV;

FIG. 15 is a chart of the preferred upper enamel thickness in mm against voltage in kV;

FIG. 16 is chart of the maximum enamel thickness in mm against voltage in kV;

FIG. 17 is chart of the combination of FIGS. 13 to 16;

FIG. 18 is a chart of the minimum capacitance in nF/m against voltage in kV;

FIG. 19 is a chart of the preferred lower capacitance in nF/m against voltage in kV;

FIG. 20 is a chart of the preferred upper capacitance in nF/m against voltage in kV;

FIG. 21 is a chart of the maximum capacitance in nF/m against voltage in kV; and FIG. 22 is a chart of the combination of FIGS. 17 to 21.

Figure 1:
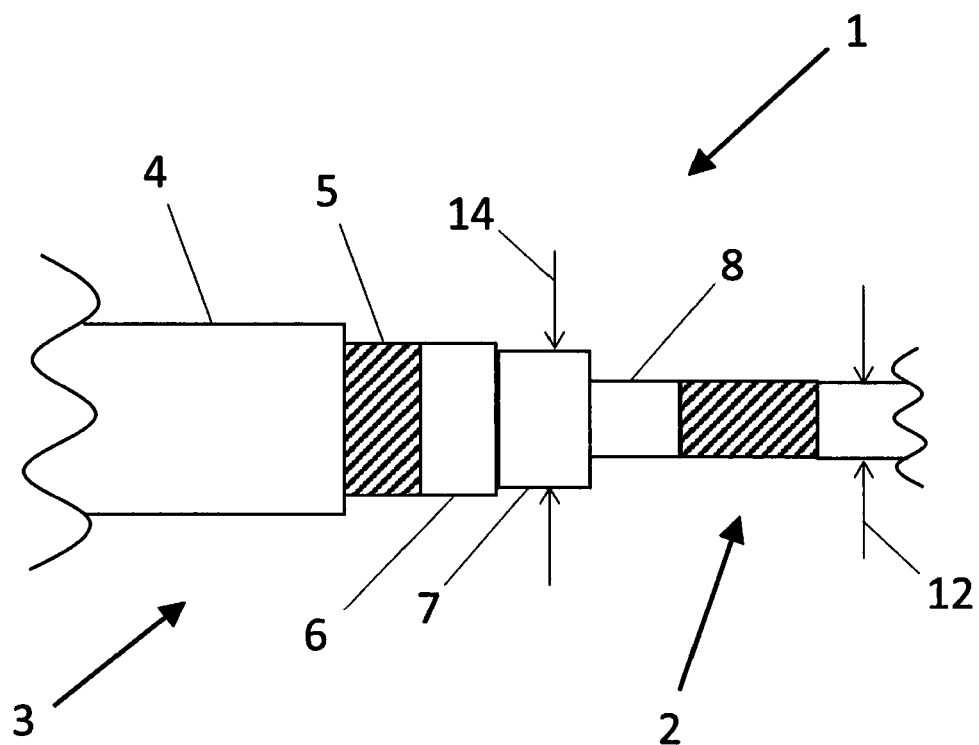
FIG. 1 is a side view of a short piece of partially stripped cable of the invention.
Figure 2:
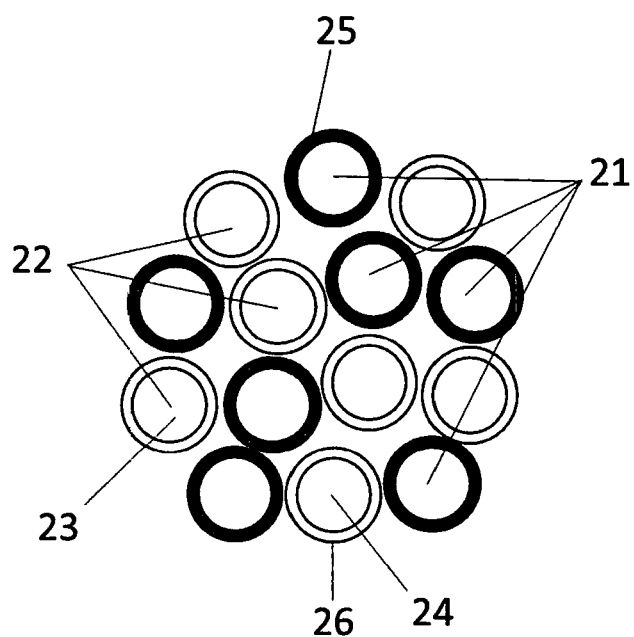
FIG. 2 is a diagrammatic view of a transverse cross-sectional view of the conductor sets of a simple conductor of the invention, without an outer sheath.

Referring to the drawings, a power transmission cable 1 has copper strands 2 within a sheath 3. The sheath is generally conventional, having an outer protective polymer layer 4, a steel/copper wire protective grounding layer 5, a semi-conductive layer 6 and an insulating layer 7 and a semi-conductive layer 8. The copper conductive strands are in accordance with the invention.

Typically in a cable intended to operate at 33 kV with a cross section of typically 300 mm2, the copper strands 2 have a lay-up diameter 12 typically of 16 mm. The insulation layer is typically 8 mm thick giving a diameter 14 of 32 mm and a ratio of 2:1. With the conductive strands having a typical capacitance between their set of 120 nF/m and the capacitance to ground of the strands in tow typically being 0.3 nF/m, this gives a capacitance to ground of two orders of magnitude less than that between the two sets of strands.

Further the insulation between the strands or layers thereof is typically 0.1-0.2 mm, giving a typical ratio of insulator to ground thickness to inter-strand insulator thickness of 40:1-80:1.

There are two sets 21,22 of the copper strands. Within each set, the strands 23,24, have respectively differently coloured, typically red and green, insulating enamel 25,26, of the type used in production of so-called "magnet wire", i.e. copper wire coated with insulating polymeric material to provide insulation between contiguous windings in an electromagnetic machine.

The strands are typically laid up as follows:
Layer 1: two red strands 23 & two green strands 24, twisted clockwise;
Layer 2: five red strands 23 & five green strands 24, twisted anti-clockwise;
Layer 3: eight red strands 23 & eight green strands 24, twisted clockwise;
Layer 4: eleven red strands 23 & eleven green strands 24, twisted anti-clockwise;
Layer 5: fourteen red strands 23 & fourteen green strands 24, twisted clockwise;
Layer 6: seventeen red strands 23 & seventeen green strands 24, twisted anti-clockwise;
Layer 7: twenty red strands 23 & twenty green strands 24, twisted clockwise.

The layers are laid with a conventional cable winding machine, with the bobbins of red and green strands for the individual layers alternated. Between each layer is wound soft polymeric material 27. After each layer is laid, the strands of the last laid layer are squeezed against this material, to urge it to fill the interstices between the strands. Again this is an essentially conventional step save that the dies, through which the strands are passed for this compression, are marginally larger than would otherwise be the case to avoid damage to the enamel.

Figure 3:
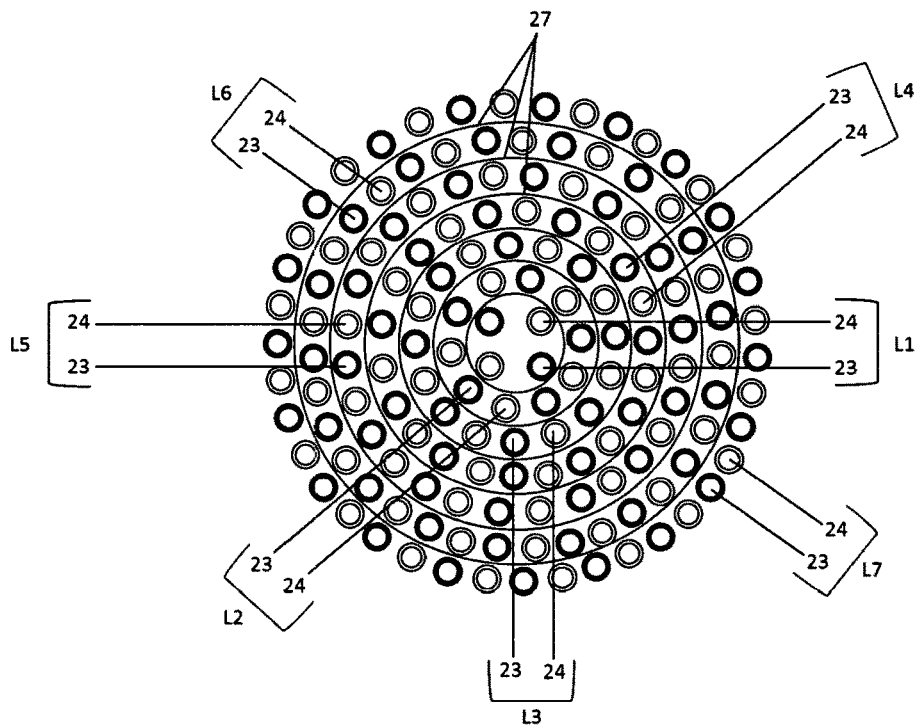
FIG. 3 is a view similar to FIG. 2 of a seven layer cable of the invention having conductor strands of two sets alternated with layers.

The strands are in intimate contact with each other, separated only by the thickness of their enamel coatings, and the soft polymer filling the interstices of between them, as when three strands lie in equilateral triangular arrangement. With reference to FIG. 3, it should be noted that although the figure shows several strands aligned with others of the same set, this figure is a cross-section at a particular point along the cable. Due to the opposite twisting of adjoining layers, cross-sectional arrangement of the strands is different at different points along the cable. The arrangement provides that the strands of the two sets are in capacitive relationship with each other.

Figure 4:
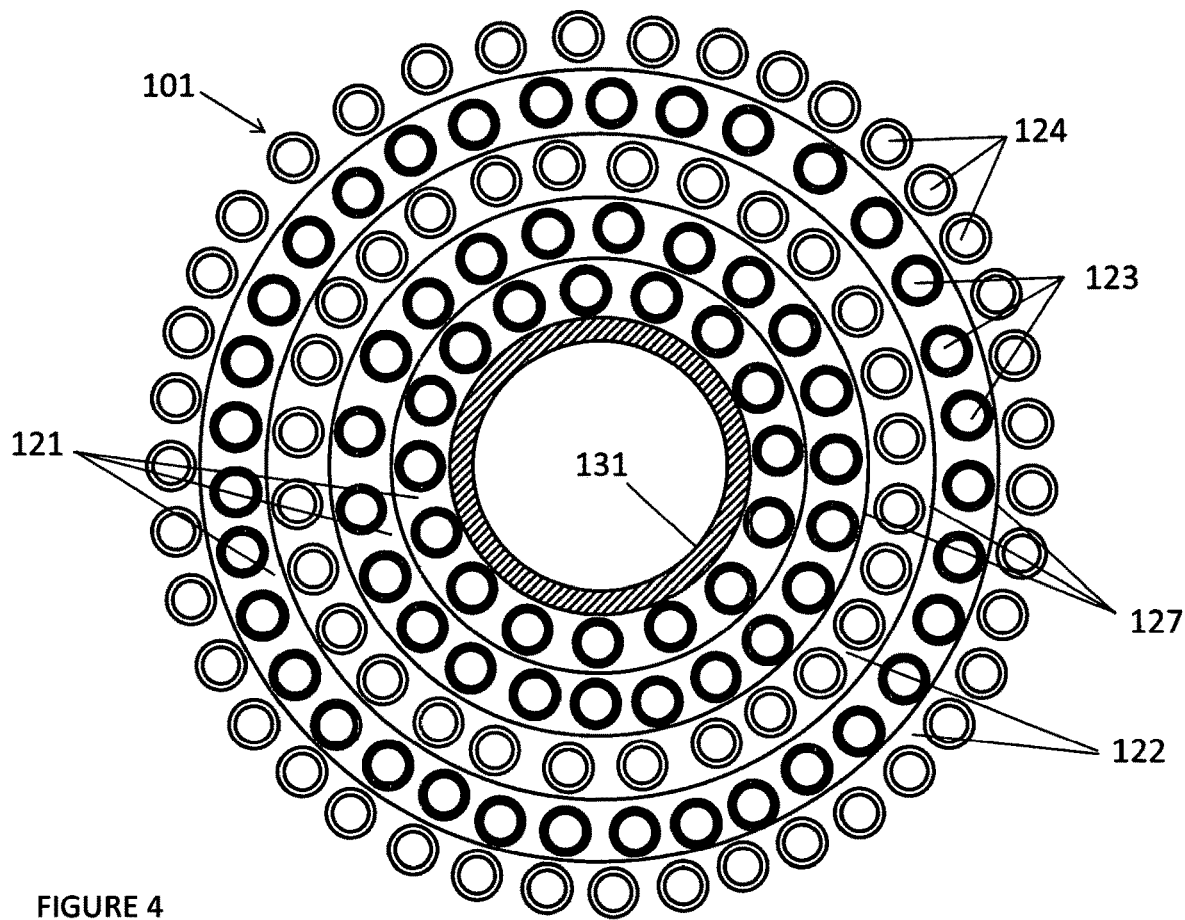
FIG. 4 is another similar view of a five layer cable in which sets of strands alternate in layers.

Turning now to FIG. 4, the power transmission cable 101 there shown has two sets 121,122 of the copper strands 123,124, having respectively differently coloured insulating enamel, and inter layer insulation 127. The strands are laid in oppositely twisted layers of all one or the other set. A central polymeric former 131 is provided, which is hollow for accommodating data fibres, such as temperature sensing optical fibres (not shown). The strands are laid as follows:
Layer 1: sixteen red strands 123;
Layer 2: twenty two red strands 123;
Layer 3: twenty eight green strands 124;
Layer 4: thirty four red strands 123;
Layer 5: forty green strands 124.

In this cable, the capacitive relationship comes from the radial alternation strands of the two sets. The reason for the additional Layer 1 of strands of the same colour/set as the next Layer 2, is that without it the total count of red strands 123 would be considerably less than that of the green strands 124, with the result that former would be carrying considerably more current at the end of the cable having these strands connected as now described.

Figure 5:
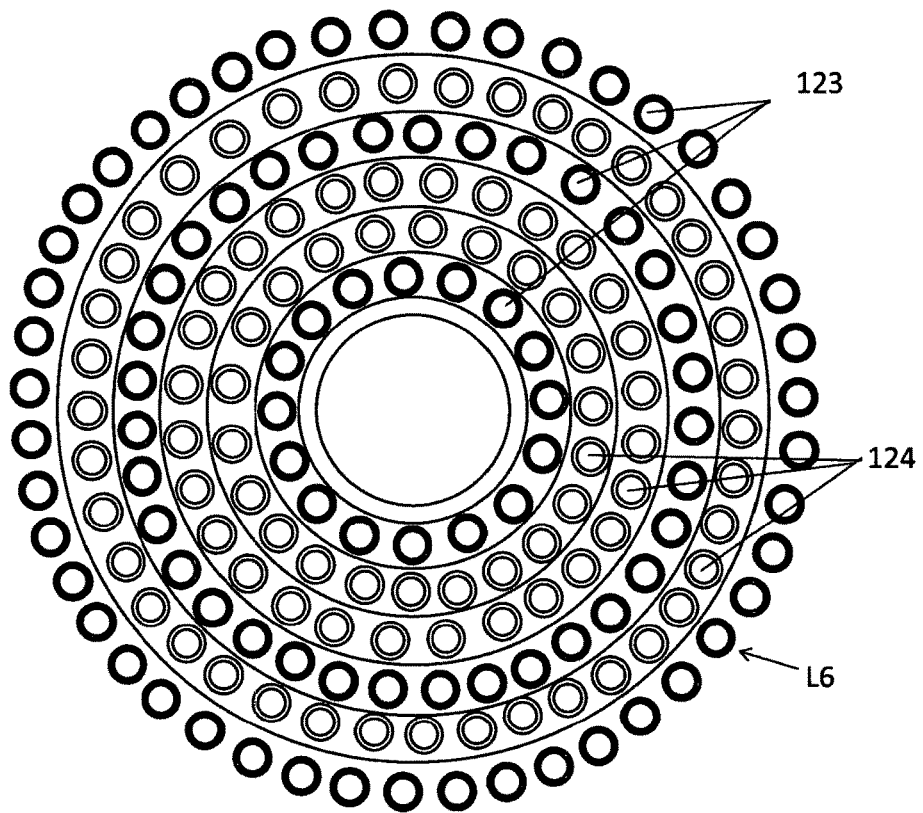
FIG. 5 is a variant of the cable of FIG. 4 with six layers.
Figure 6:
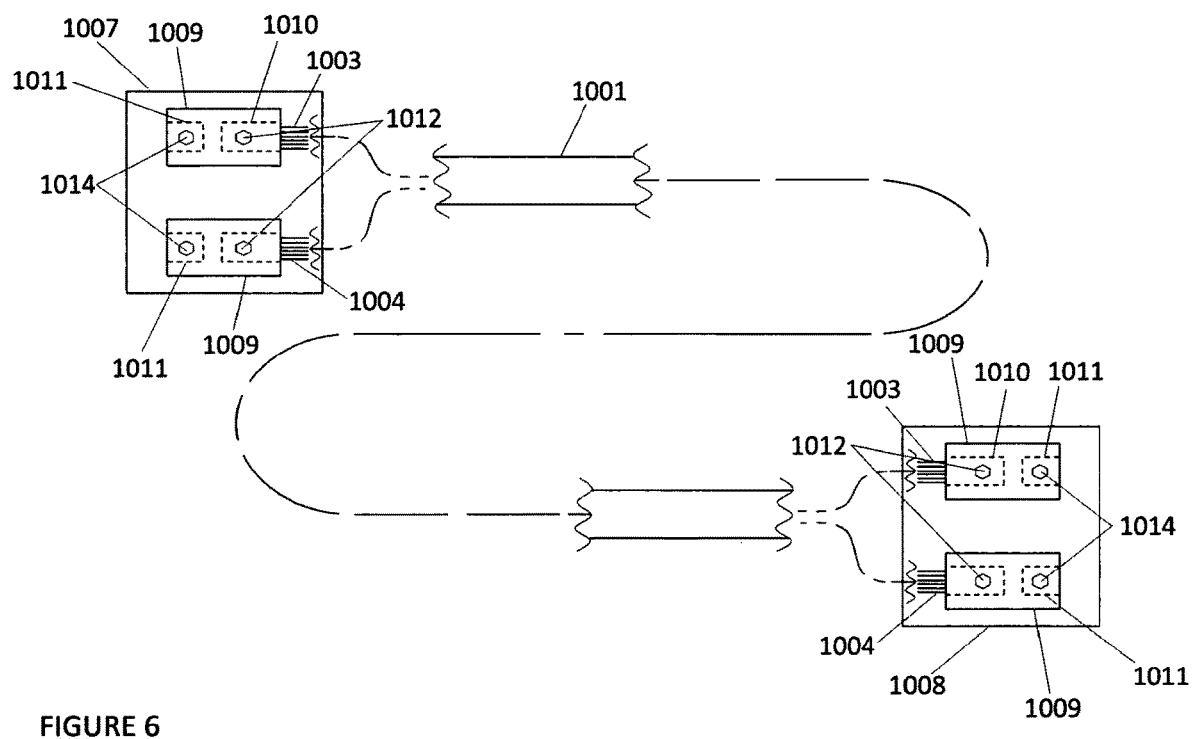
FIG. 6 is a diagram of the cable of FIG. 2 provided with similar connectors at both ends for parallel connection of the cable with other such cables.
Figure 7:
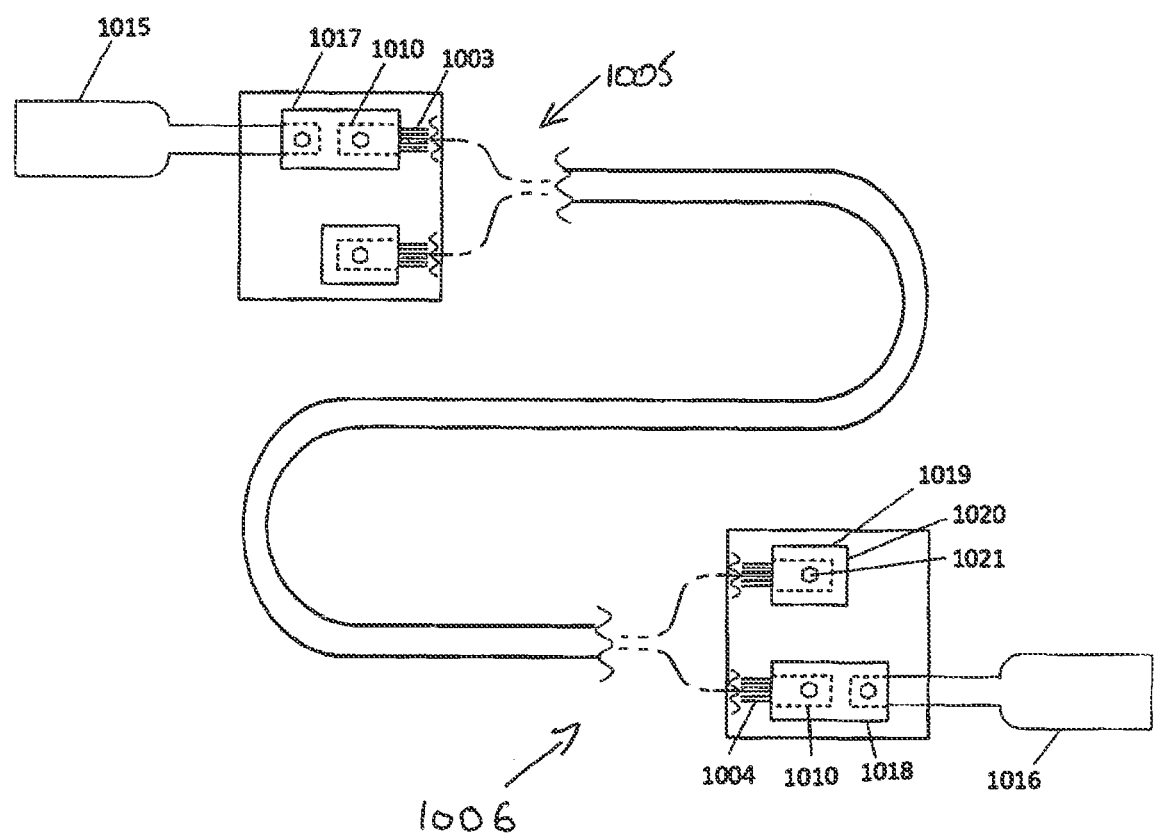
FIG. 7 is a diagram of the cable of FIG. 2 provided with bus-bar connectors at its end.

A variant of the second transmission cable is shown in FIG. 5. In it, it is not the inside two layers that are of the same set, but the second and third layers. The number of strands per layer of the different strands is
Layer 1: sixteen red strands 123;
Layer 2: twenty two green strands 124;
Layer 3: twenty eight green strands 124;
Layer 4: thirty four red strands 123;
Layer 5: forty green strands 124;
Layer 6: forty six red strands 123.

This cable has the further layer 6, increasing its power transmission capability.

For choice of the capacitance per unit length of the cable, account is taken of the inductance of the cable and other components of the electrical supply system of which the cable is part, with a view to balancing this inductance with the capacitance of the cable. More specifically, the following steps are gone through:

1. Selecting an initial cable size in accordance with the voltage and current that the cable is to carry, in particular, the cross-sectional area of metal to be included in the core; and on a first iteration the number of enamelled wires to and/or the number of layers; and the length (l):
2. Computing the design inductance of the cable ($L_D$) and the resistance of the cable (R) using computer simulation and modelling and including in particular its inherent inductance and any mutual inductance that may result from its inclusion in a 3-phase system, as if it were a conventional cable if need be:
3. Noting that for the inductive reactance for the cable resulting from $L_D$ is given by the Inductive Reactance Equation:

$X_L = 2\Pi f L_D$ where f equals the operating frequency in Hz, normally 50 or 60 Hz;
4. Noting that for the capacitive reactance of the cable, for a capacitance C is given by the Capacitve Reactance Equation:

$X_C = 1/2\Pi f C$ where f equals the operating frequency in Hz, normally 50 or 60 Hz;
5. Noting that for $X_L$ to be approximately equal but slightly larger than $X_C$, the following range is recommended:

$0.4R > X_L - X_C > 0$;

$2\Pi f L_D - 1/2\Pi f C < 0.4R$ $2\Pi f L_D - 1/2\Pi f C > 0$;

6. Computing the desired cable capacitance (C) within this range:

$1/((2\Pi f)^2 L_D - 2\Pi f(0.4R)) > C > 1/(2\Pi f)^2 L_D$;

7. Using the tables below, suitable cable parameters can be chosen, which may result in revision of the number of wires or number of layers, in which case the cable choice can be refined;
8. Should all of the inductance not be able to be balanced, a cable that can balance as much as possible of $L_D$ and carry its load is chosen;
9. If other elements of inductance are to be balanced. This can be taken account of by modifying the values of $L_D$ and thus $X_L$;
10. The resulting design is then modelled in simulation to validate the original inductance computation $L_D$ and the resulting $X_L$ and $X_C$ which may suggest design revision. One or more further iterations may be required.

In order of magnitude terms, for a 15 km cable, 120 nF/m can balance a cable inductance of 375 nH/m, which is typical for a 3 phase 33 kV cable laid in trefoil. That said, it should be noted that if a different length of cable is concerned the effect of its length must be taken into account.

The above steps need to take account of the fact that even for magnet wire enamel, the withstand strength of a dielectric does not rise linearly with voltage, as shown in the Charts 1 to 6 (FIGS. 11 to 16).

The tables referred to are:

TABLE 1

Enamel Thickness in mm for Varying Maximum Voltage in kV

| Maximum Voltage - kV | Minimum Thickness - mm | Preferred Lower Thickness - mm | Preferred Upper Thickness - mm | Maximum Thickness - mm |
|---|---|---|---|---|
| 3.6 | 0.024 | 0.026 | 0.105 | 0.202 |
| 7.2 | 0.034 | 0.037 | 0.148 | 0.242 |
| 12 | 0.040 | 0.043 | 0.172 | 0.247 |
| 17.5 | 0.040 | 0.043 | 0.172 | 0.247 |
| 24 | 0.040 | 0.043 | 0.172 | 0.247 |
| 36 | 0.040 | 0.043 | 0.172 | 0.247 |
| 52 | 0.041 | 0.045 | 0.179 | 0.251 |
| 72.5 | 0.044 | 0.047 | 0.190 | 0.262 |

It will be noted that the Y-axis scale differs between the above charts and that the minimum and lower preferred plots are similar. To give an appreciation of their relative values, they can be combined as shown in Charts 7 to 12 (FIGS. 17 to 22), and in Tables 2 to 6 below.

TABLE 2

Dielectric Tape Thickness in mm for Varying Maximum Voltage in kV

| Maximum Voltage - kV | Minimum Thickness - mm | Preferred Lower Thickness - mm | Preferred Upper Thickness - mm | Maximum Thickness - mm |
|---|---|---|---|---|
| 3.6 | 0.027 | 0.040 | 0.211 | 0.404 |
| 7.2 | 0.038 | 0.055 | 0.295 | 0.485 |
| 12 | 0.059 | 0.065 | 0.344 | 0.495 |
| 17.5 | 0.059 | 0.065 | 0.344 | 0.495 |
| 24 | 0.059 | 0.065 | 0.344 | 0.495 |
| 36 | 0.059 | 0.065 | 0.344 | 0.495 |
| 52 | 0.062 | 0.067 | 0.358 | 0.503 |
| 72.5 | 0.065 | 0.071 | 0.379 | 0.523 |

TABLE 3

Capacitance in nF/m for Varying Maximum Voltage in kV

| Maximum Voltage - kV | Minimum Capacitance - nF/m | Preferred Lower Capacitance - nF/m | Preferred Upper Capacitance - nF/m | Maximum Capacitance - nF/m |
|---|---|---|---|---|
| 3.6 | 22.0 | 44.0 | 264.0 | 316.8 |
| 7.2 | 21.0 | 42.0 | 252.0 | 302.4 |
| 12 | 20.0 | 40.0 | 240.0 | 288.0 |
| 17.5 | 18.5 | 37.0 | 222.0 | 266.4 |
| 24 | 17.5 | 35.0 | 210.0 | 252.0 |
| 36 | 16.0 | 32.0 | 192.0 | 230.4 |
| 52 | 15.0 | 30.0 | 180.0 | 216.0 |
| 72.5 | 14.5 | 29.0 | 174.0 | 208.8 |

TABLE 4

Individual Strand Diameter in mm for Varying Maximum Voltage in kV

| Maximum Voltage - kV | Minimum Strand Diameter - mm | Preferred Lower Strand Diameter - mm | Preferred Upper Strand Diameter - mm | Maximum Strand Diameter - mm |
|---|---|---|---|---|
| 3.6 | 0.50 | 0.60 | 2.50 | 3.00 |
| 7.2 | 0.50 | 0.60 | 2.50 | 3.00 |
| 12 | 0.50 | 0.60 | 3.00 | 4.00 |
| 17.5 | 0.50 | 0.60 | 3.00 | 4.00 |
| 24 | 0.50 | 0.60 | 3.00 | 4.00 |
| 36 | 0.50 | 0.60 | 3.50 | 4.50 |
| 52 | 0.50 | 0.70 | 3.50 | 4.50 |
| 72.5 | 0.70 | 0.80 | 4.00 | 5.00 |

TABLE 5

Number of Strands for Varying Maximum Voltage in kV

| Maximum Voltage - kV | Minimum Number of Strands | Preferred Lower Number of Strands | Preferred Upper Number of Strands | Maximum Number of Strands |
|---|---|---|---|---|
| 3.6 | 19 | 37 | 271 | 397 |
| 7.2 | 19 | 37 | 271 | 397 |
| 12 | 19 | 37 | 397 | 547 |
| 17.5 | 19 | 37 | 397 | 547 |
| 24 | 19 | 37 | 397 | 547 |
| 36 | 19 | 37 | 397 | 547 |
| 52 | 19 | 37 | 397 | 547 |
| 72.5 | 19 | 37 | 397 | 547 |

TABLE 6

Number of Layers for Varying Maximum Voltage in kV

| Maximum Voltage - kV | Minimum Number of Layers | Preferred Lower Number of Layers | Preferred Upper Number of Layers | Maximum Number of Layers |
|---|---|---|---|---|
| 3.6 | 3 | 4 | 10 | 12 |
| 7.2 | 3 | 4 | 10 | 12 |
| 12 | 3 | 4 | 12 | 14 |
| 17.5 | 3 | 4 | 12 | 14 |
| 24 | 3 | 4 | 12 | 14 |
| 36 | 3 | 4 | 12 | 14 |
| 52 | 3 | 4 | 12 | 14 |
| 72.5 | 3 | 4 | 12 | 14 |

The above tables and charts show values of variables for the most common power transmission voltages. The invention is not restricted to these voltages. Indeed, the following charts, which are based for the central portion of their graphs, show a wider range of voltages.

Both above described cables, including the variants, are connected in essentially the same way in that the strands of the one set, typically the red set, are bundled and at both ends and the strands of the other set are bundled in a like manner.

After division into respective bundles, the enamel is stripped from the ends of the strands. The stripped strands are inserted into respective terminal block and tightly clamped together, providing mechanical and more importantly electrical connection.

Turning now to FIGS. 6 to 10, connectors for a cable 1001 of the invention will now be described. All the red wires 1003 are bundled together. All the green wires 1004 are similarly bundled. The wires are similarly bundled at the other end of the cable. The enamel is removed from the ends of the bundled wires, suitably by dipping in solvent. The bundled ends are brought together in respective connectors 1007,1008. These have double-ended sockets 1009 for the bundles. Each end of the sockets has bores 1010 with clamping screws 1012 for the bundles of the cable. The bundled wires are inserted in the bores 1010 and clamped. This arrangement allows for the cable 1001 to be connected in parallel to other such cables with their red wires connected by the connectors to the red wires of the cable 1001 and the green wires similarly connected. For this the sockets have other end bores 1011 and other end clamping screws 1014. The bores 1011 could be through bores with the bores 1010. Their arrangement with un-bored middles ensures that neither set of wires takes up spaces intended for the other.

Where the cable is to be used as a single length between a supply and a load, the electrical connection of the cable is between the red wires and the green wires as an elongate capacitor, extending the length of the cable 1001. Respective supply and load cables/bus-bars 1015,1016 are clamped in the other bores 1011 of the red wire socket 1017 at one end of the cable and of the green wire socket 1018 at the other end. Thus the red wires 1003 are connected to the supply cable/bus-bar 1015 at the end 1005 and the green wires 1004 are connected to the load cable/bus-bar 1016 at the end 1006. There is no metal/metal contact between the supply cable/bus-bar 1015 and the load cable/bus-bar 1016.

The connectors have other, insulated single-ended sockets 1019 with a single bore 1020 and a single clamping screw 1021. The other wires, i.e. green wires at the supply end and the red wires at the load end, are received and clamped in these sockets. These wires are not connected by the sockets and are clamped purely for mechanical reasons in ensuring that they remain insulated. They do not need to be stripped of their insulating enamel, indeed leaving them enamelled assists in their identification. These insulated ends play no part in power transmission.

Figure 8:
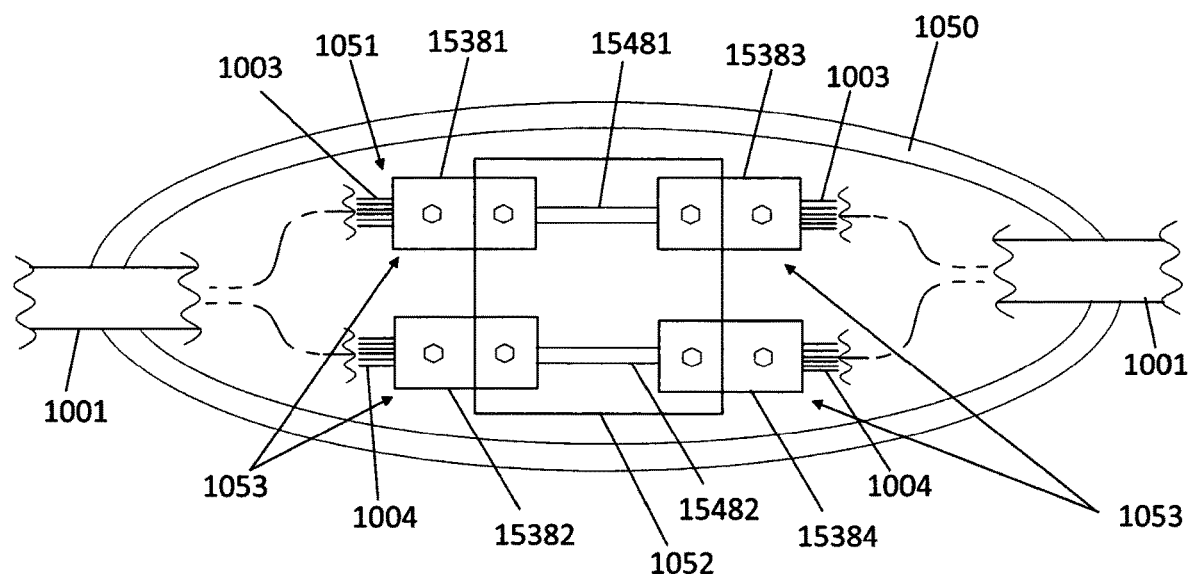
FIG. 8 is a parallel connector for a pair of cables of the invention.
Figure 9:
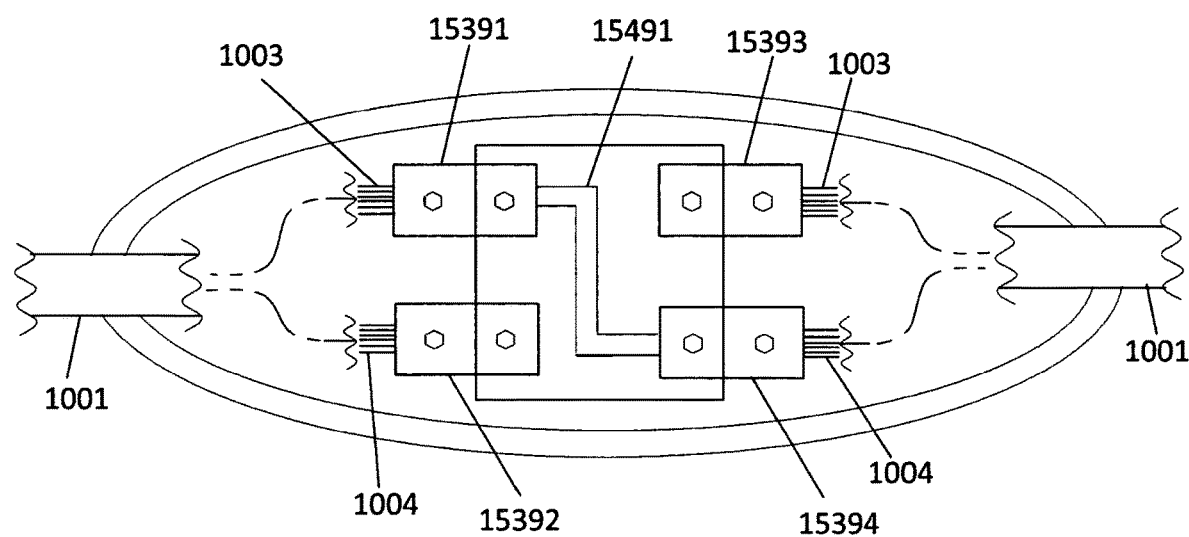
FIG. 9 is a series connector for a pair of cables of the invention.
Figure 10:
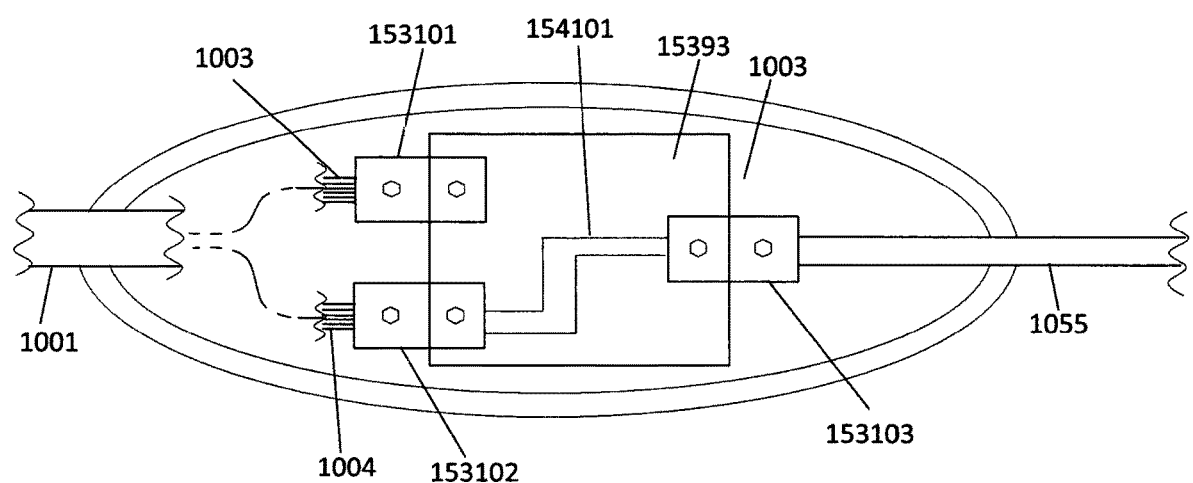
FIG. 10 is a cable end connector for a cable of the invention.

The connectors shown in FIGS. 4 and 5 are shown diagrammatically. FIGS. 8, 9 & 10 show more detail. They include a connector cover 1050 which is essentially conventional and filled in use with insulating material 1051. The actual connection arrangements comprise central blocks 1052 of insulating material having four sockets 1053, with bores and bolts for clamping the cable wires, extending from each end. There are three sockets in the case of FIG. 10.

The sockets on one side are electrically connected internally to the sockets on the other side. This is by a short length of conventional cable, between internal bores and bolts. The connections are made first and then the blocks are formed around the connections.

In the case of FIG. 8, the four sockets are connected in pairs, socket 15381 to socket 15383 and socket 15382 to socket 15384, via two short cable lengths 15481,15482. This connector allows two cables of the invention to be connected in parallel, with for instance the red wires 1003 of the cables being connected by sockets 15381,15383 and cable 15481 and the green wires 1004 by the sockets 15382,15384 and cable 15482.

In the case of FIG. 9, the four sockets are connected in one pair, socket 15391 to socket 15394 via a short cable length 15491; whilst the sockets 15392, 15393 are unconnected. This connector allows two cables of the invention to be connected in series, with for instance the red wire of the cable being connected at sockets 15391, 15392 by the cable 15491 to the green wires of the cable connected at sockets 15393, 15394. The green wires of the first cable and the red wires of the second cable are merely anchored by the connectors 15392, 15393. The cable 15491 crosses from top to bottom to allow the red wires and the green wires on opposite sides to be connected at the same relative positions.

In the case of FIG. 10, three sockets are provided with one internal cable 154101. On one side are sockets 153101, 153102 for the incoming cable and on the other side is socket 153103 for an outgoing conventional cable 1055 to a supply or load. This allows both green wires of the incoming cables to be connected by the internal cable 154101 to the single socket 153103, with the red wires of the incoming cable to be anchored.

Similar connectors for aerial cables, with the additional feature of mechanical connection to the tension core can be provided.

If the capacitance of the combined lengths needs to be less, the connector can be a series connector as shown in FIG. 9. With a red (cable A) to green connection (cable B) between the two cables, the free ends capacitance is between the green wires of cable A and the red wires of cable B. The capacitance is in effect of a single length with double the dielectric gap. It is given by the formula for capacitances in series:

Series Capacitances $$C_{total} = \frac{1}{\frac{1}{C_1} + \frac{1}{C_2} + \dots \frac{1}{C_n}}$$

Where the two lengths are identical, the capacitance is halved.

A feature of capacitances in series is that the voltage across individual ones is divided by the number of capacitances. This is useful in enabling a high voltage line to be comprised of three sections, each carrying ⅓ of the high voltage. This has further advantages in reducing the thickness of the dielectric coating or tape/paper between the conductors. Thus loss of capacitance by connection in series can be offset by higher capacitance per unit length in the first place.

In respect of the connectors, details can be altered. For instance, the bundled ends of the conductor wires may be preliminarily crimped before insertion the sockets. Further the sockets themselves may be crimped as opposed to screwed, via oppositely arranged openings in the connector bodies which can be subsequently sealed closed.

The invention is not intended to be restricted to the details of the above described embodiment. For instance, more or less conductive layers can be provided. They can be provided as an even number as above or an uneven number of conductive cylinders with the inner and outer most interconnected. At the centre of the cable, a steel core can be provided for strength of the cable. Alternatively, or additionally, a hollow conduit may be provided centrally, for accommodating other elongate elements such as optical fibres for data transmission and/or temperature monitoring.

The invention claimed is:

1. A capacitive power transmission cable comprising:
    at least two sets (21,121; 22,122) of conductive strands (23,123; 24,124),
        the sets of strands being insulated from each other and in capacitive relationship, the one with the other and the strands of the sets being distributed in a transverse cross-section of the cable,
    characterised in that:
        capacitance between the two or more sets of strands, when all strands of respective sets are electrically connected together, is at least 10 nF/m and
        the strands are laid in layers (L1, L2, L3, L4, L5, L6, L7) of opposite twist.

2. A capacitive power transmission cable as claimed in claim 1, wherein the capacitance between the sets of strands is within the range 10 to 170 nF/m for a 3.6 kV cable or 5.5 to 92.5 nF/m for a 72.5 kV cable or 14 to 235 nF/m for a 240V cable or 5 to 84 nF/m for 145 kV cable.

3. A capacitive power transmission cable according to claim 1, wherein all of the strands of at least one of the sets having a respective insulation (25,125; 26,126) of dielectric strength to enable the sets of conductive strands to remain isolated.

4. A capacitive power transmission cable according to claim 1, wherein the sets are insulated from each other by insulation which is at least 10 μm thick.

5. A capacitive power transmission cable according to claim 1, wherein the sets are insulated from each other by insulation which is between 20 μm and 540 μm thick.

6. A capacitive power transmission cable according to claim 1, wherein the sets are insulated from each other by insulation which is between 17 μm and 1079 μm thick.

7. A capacitive power transmission cable according to claim 1, wherein the strands (23,123; 24,124) of the two, or more sets (21,121; 22,122), are alternated in their layers (L1, L2, L3, L4, L5, L6, L7).

8. A capacitive power transmission cable according to claim 1, wherein the strands (23,123; 24,124) are laid in alternating layers (L1, L2, L3, L4, L5, L6, L7) of all one set (21; 121) and then all another set (22; 122).

9. A capacitive power transmission cable according to claim 1, wherein at least one of the sets (21,121; 22,122) of conductive strands (23,123; 24,124) is uninsulated, with the insulation of the strands (25,125; 26,126) of the other set (21,121; 22,122) providing the insulation.

10. A capacitive power transmission cable according to claim 1, including:
    insulation (27; 127) between layers (L1, L2, L3, L4, L5, L6, L7) of different sets (21,121; 22,122), whereby the at least two sets are in capacitive relation to each other.

11. A capacitive power transmission cable according to claim 10, wherein the insulation is soft polymer insulation between each layer to fill interstices between individual strands.

12. A capacitive power transmission cable according to claim 1, wherein the insulation is of tape between 30 μm and 1.35 mm.

13. A capacitive power transmission cable according to claim 10, wherein the insulation is of tape between 25 μm and 2.7 mm thick.

14. A capacitive power transmission cable according to claim 10, wherein one set of strands is coloured and the other is uncoloured.

15. A capacitive power transmission cable according to claim 10, wherein one set of strands is coloured being of tinned strands and the other is uncoloured being of plain strands.

16. A capacitive power transmission cable according to claim 1, wherein the insulation is by means of insulating coatings (25,125; 26,126) of enamel of the type used in so-called "magnet wire" or the insulating coatings are extruded, wound or woven.

17. A capacitive power transmission cable according to claim 1, wherein all sets of strands have their own insulation and the respective insulations of the sets are differently coloured to allow their separation for connection at opposite ends of the cable.

18. A capacitive power transmission cable according to claim 1, wherein all sets of strands have their own insulation and the respective insulations of the sets are of different colours of enamel between the sets to allow their separation for connection at opposite ends of the cable.

19. A capacitive power transmission cable according to claim 1, wherein there are between 37 and 397 strands per set.

20. A capacitive power transmission cable according to claim 1, wherein there are between 19 and 547 strands per set.

21. A capacitive power transmission cable according to claim 1, wherein the strands are of copper or aluminium wire.

22. A capacitive power transmission cable according to claim 1, wherein the strands are die compressed in their layers.

23. A capacitive power transmission cable according to claim 1, wherein the layers are of single conductor diameter thickness when the layers are insulated from each other.

24. A capacitive power transmission cable according to claim 1, wherein the layers comprise two sub-layers of conductors, laid one way and the other.

25. A capacitive power transmission cable according to claim 24, wherein the sub-layers within each layer are preferably braidingly combined.

26. A capacitive power transmission cable according to claim 1, including:
  insulation (7) around the capacitively connected sets of strands, and
  a grounding sheath (5) around the insulation, the grounding sheath being in capacitive connection with the capacitively connected sets of strands, with the insulation being sufficiently thick to act as a dielectric causing conductive strands to sheath capacitance to be substantially two orders of magnitude, or more, less than capacitance between the two sets of strands.

27. A capacitive power transmission cable according to claim 26, wherein the sheath is of spirally laid steel wires for armouring and action as an earth conductor.

28. A capacitive power transmission cable according to claim 1, wherein, for connection to a supply conductor or a load conductor, a connector block (1007,1008) is provided with terminals (1009) for a first and second set of conductors (1003,1004) at respective ends (1005,1006) of the cable.

29. A capacitive power transmission cable according to claim 28, wherein the supply or load terminal is a bus-bar (1015,1016) permanently connected thereto and one terminal (1019) in each block is isolated without a supply or load connection terminal, whilst the other is provided with a supply or load terminal (1017,1018).

30. A capacitive power transmission cable according to claim 1, including a parallel-connection connector comprising respective terminals (15381/2/3/4) for respective sets of conductors on both sides and with internal interconnections (15481/2), whereby the one conductor of one length is connected to the one conductor of the other length, and the other conductors are similarly connected.

31. A capacitive power transmission cable according to claim 1, including a series-connection connector having a terminal (15391) on one side for one set connected internally to a terminal (15394) on the other side for one or other set of the other length, and isolated terminals (15392/3) on the respective sides of the connector for the remaining sets to be terminated in.

32. A capacitive power transmission cable according to claim 1 in combination with at least two or more such cables, at least one parallel connector comprising respective terminals (15381/2/3/4) for respective sets of conductors on both sides and with internal interconnections (15481/2), whereby the one conductor of one length is connected to the one conductor of the other length, and the other conductors are similarly connected and at least one serial connector comprising a terminal (15391) on one side for one set connected internally to a terminal (15394) on the other side for one or other set of the other length, and isolated terminals (15392/3) on the respective sides of the connector for the remaining sets to be terminated in, the cables and the connectors being connected as a long cable of desired capacitance.

33. A capacitive power transmission cable according to claim 1, the cable including at least one additional set of strands for choice of capacitance of the cable or for straight through connection.

34. A capacitive, power transmission cable according to claim 1, wherein
  the strands of one or more adjacent layers being of all one set and then radially outwards the strands of one or more adjacent layers being of all another set,
  insulation between the layers of different sets, whereby the at least two sets are in capacitive relation to each other and
  the individual strands are not insulated and are preferably differently coloured between their sets, one set of strands normally being of tinned strands and the other normally being of plain strands.

35. A capacitive power transmission cable according to claim 1, comprising strands of at least two sets in each layer.

36. A capacitive power transmission cable according to claim 1, having all the strands of respective sets connected together, one set at one end and the other set at the other end.

37. Use of a capacitive power transmission cable according to claim 1, for transmitting power with one set connected to an electrical power source at one end and with the set connected to a load at the other end.

* * * * *